United States Patent [19]
Rogge

[11] 3,784,227
[45] Jan. 8, 1974

[54] RETRACTABLE STEP FOR PASSENGER VEHICLES

[76] Inventor: Gail E. Rogge, 23851 Lyon St., San Jacinto, Calif. 92883

[22] Filed: June 19, 1972

[21] Appl. No.: 263,927

[52] U.S. Cl. ............................................. 280/166
[51] Int. Cl. ............................................. B60r 3/02
[58] Field of Search ................ 280/166, 164 A, 163

[56] References Cited
UNITED STATES PATENTS
2,665,921   1/1954   Schetzer ........................ 280/164 A
1,467,976   9/1923   Gannon ............................ 280/166

Primary Examiner—Robert R. Song
Attorney—Christie, Parker & Hale

[57] ABSTRACT

A retractable step for a pickup truck or other vehicle which includes a tread member secured at one end to a bracket which attaches to and extends downwardly from the bottom of the door. The tread member extends inwardly beneath the car and is slidably supported by a U-shaped bracket mounted to and beneath the frame of the truck. Opening the door slides the tread member outwardly from beneath the truck, the tread member being supported, when the door is open, between the bracket attached to the door and the bracket attached to the frame to form a step.

6 Claims, 5 Drawing Figures

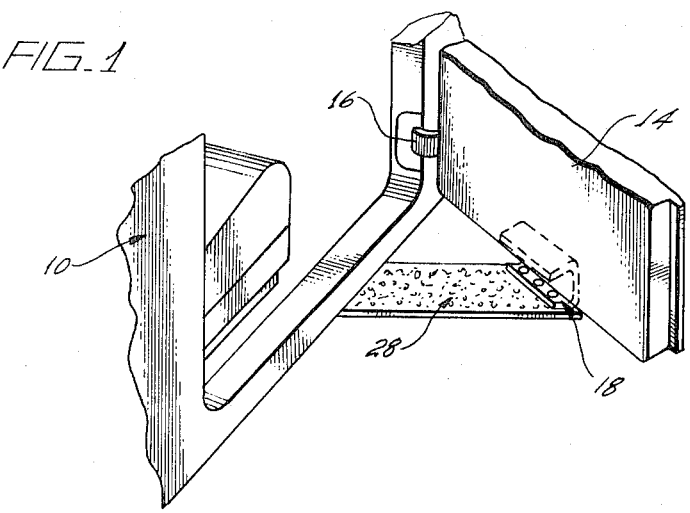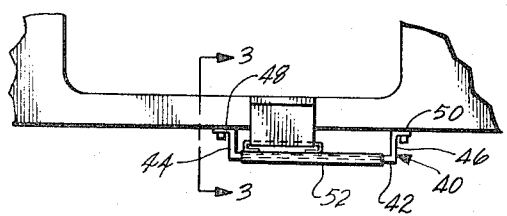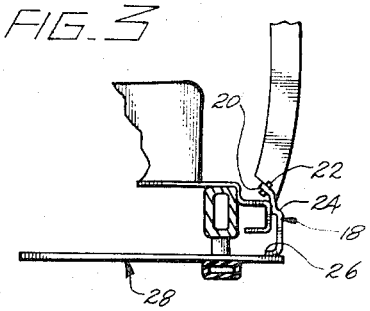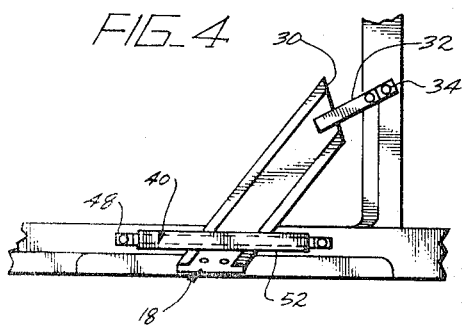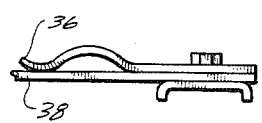

3,784,227

RETRACTABLE STEP FOR PASSENGER VEHICLES

FIELD OF THE INVENTION

This invention relates to a step for climbing in and out of a motor vehicle, and more particularly, is concerned with a retractable step attached to and movable with the door.

BACKGROUND OF THE INVENTION

Greatly increased use of pickup trucks as pleasure vehicles for use with campers or pulling trailers for family use is well known. Because pickup trucks are designed to operate off the highway under more primitive circumstances than the pleasure automobile, the pickup truck is designed with higher road clearance and a shorter cab. As a result, the level of the seat is considerably higher off the ground than in the usual passenger automobile. Particularly in the case of short women and children, this presents a problem in climbing in and out of the truck.

With the demise of the fixed running board, there is developed a need for some type of step arrangement which would make it easier to get into and out of a pickup truck. While various types of devices have heretofore been proposed for providing a step which folds out the vehicle when the door is opened, such known devices have been difficult to install, requiring substantial modification to the vehicle or have involved various linkages and springs which have required lubrication and other maintenance, and/or have materially detracted from the appearance of the vehicle.

SUMMARY OF THE PRESENT INVENTION

The present invention is directed to a retractable step for a pickup truck or other similar motor vehicle which requires no linkages or springs to perform the retraction function. The step structure of the present invention is easy to install without defacing or substantially modifying the vehicle. The step requires no maintenance, such as lubrication, and is simple and rugged in its design and construction.

The above advantages of the present invention are achieved by providing a tread member which is rigidly secured at one end to the lower edge of the door and is supported beneath the vehicle so as to be pulled out and retracted from beneath the vehicle as the door is opened and closed. The inner end of the tread member is slidably supported on a U-shaped bracket attached to and extending downwardly from the frame beneath the vehicle. When the door is opened, the tread member bridges the space between the door and the lower edge of the vehicle providing a step for climbing into and out of the vehicle.

BRIEF DESCRIPTION OF THE DRAWINGS

For a more complete understanding of the invention, reference should be made to the accompanying drawings, wherein:

FIG. 1 is a fragmentary perspective view of part of the vehicle showing the retractable step;

FIG. 2 is a fragmentary side view showing the step in the retracted position;

FIG. 3 is a sectional view taken substantially on the line 3—3 of FIG. 2;

FIG. 4 is a fragmentary bottom view of the vehicle; and

FIG. 5 is a detailed view of the clip support shown in FIG. 4.

DETAILED DESCRIPTION

Referring to the drawings in detail, the numeral 10 indicates generally the cab of a pickup truck having a door 14 which is supported by hinges, one of which is shown at 16, the door being shown in open position in the perspective view of FIG. 1.

The retractable step assembly of the present invention includes a first bracket member 18. The first bracket member 18, as shown in FIG. 1, includes an upper flange portion 20 which is secured to the bottom of the door by sheet metal screws 22. The bracket 18 is formed with an offset 24 which permits the bracket to project outwardly beyond the outer surface of the door and the adjacent lower portion of the outer surface of the body of the vehicle beneath the door when the door is closed.

The lower edge of the first bracket 18 is provided with a flange 26 by means of which it is bolted or otherwise secured to a tread member indicated generally at 28. The tread member is trapezoidal in shape, as best seen in FIG. 4, and is formed of heavy gage sheet metal with the longitudinal edges being folded down and then inwardly to provide longitudinal stiffening of the tread member, as best seen in FIG. 2. As further seen in FIG. 4, with the door of the vehicle closed, the tread member extends inwardly beneath the bottom of the vehicle. The trapezoidal shape provides end margins that are roughly 90° with respect to each other and roughly 45° with respect to the parallel edges. This shape permits the tread member to extend in a forward direction as well as inwardly of the vehicle when the door is closed and the step is in the retracted position.

The inner edge 30 of the tread member, with the door in the closed position as shown in FIG. 4, engages a clip 32 which is bolted or otherwise secured to the under carriage of the vehicle, as indicated at 34. the clip 32 is formed with a pair of opposing clip fingers 36 and 38 between which the tread member is wedged when the step is in the retracted position. The clip 32 thus securely grips the inner edge of the tread member, preventing any vibration or rattling movement of the tread member when the door is closed.

When the door is opened, the tread member 28 is withdrawn from the clip 32 and moved into the position shown in FIG. 1 and shown in dotted lines in FIG. 4. With the door in the open position, the inner edge 30 of the tread member 28 is supported by a second bracket member indicated generally at 40. The second bracket member is formed with an elongated bar section 24 and is bent upwardly in a pair of end portions 44 and 46 that are terminated in flanges 48 and 50. The bracket 40 is bolted or otherwise secured to the underside of the frame just below the door cell of the vehicle by means of the flanges 48 and 50. The bar portion 42 is preferably enclosed in a sheathing 52 of plastic material, such as Neoprene plastic, which provides a tough yet cushioned surface across which the tread member slides as it is moved outwardly from its retracted position.

As seen in FIG. 1, when the door 14 is opened, the tread member 28 bridges the space between the door and the cab of the vehicle, one edge being supported by the first bracket 18 from the bottom of the door and the other edge being supported by the second bracket 40 from the frame of the vehicle. When in this position, the tread member 28 provides a step which is lower than the floor of the vehicle, thereby providing a convenient step for getting into and out of the passenger compartment. The top of the tread member 28 may be provided with a non-slip surface, which may, for example, be formed by dimpling the surface of the tread member to prevent a person's foot from slipping as he uses the step.

From the above description, it will be seen that a retractable step has been provided which can be easily mounted on a cab of a conventional pickup truck. It provides a rigid support when the door is open, yet moves easily out of the way beneath the vehicle when the door is closed.

What is claimed is:

1. In a motor vehicle having a hinged outwardly opening door and portion of the body frame extending below the bottom of the door, retractable step apparatus comprising:

a movable tread member, a first bracket secured to the lower edge of the door and projecting downwardly to a lower end disposed below the level of the body frame adjacent the door opening, a second bracket secured to the body frame adjacent the bottom of the door, the second bracket member including a substantially horizontal bar portion disposed below the body at substantially the level of the lower end of the first bracket, the tread member slidably engaging the top of said bar portion, one end of the tread member being secured to the lower end of the first bracket, whereby swinging of the door slides the tread member across the bar portion of the second bracket to support the tread member in a horizontal step position.

2. Apparatus as defined in claim 1 further comprising a clip member secured to the body frame, the member having spring fingers between which the end of the tread member remote from the door is wedged when the door is closed.

3. Apparatus as defined in claim 2 further including a layer of plastic material positioned on the bar for providing a tough low friction wearing surface engaged by the tread member.

4. Apparatus as defined in claim 3 wherein the tread member is rigidly secured to the door by the first bracket.

5. A fold-away step apparatus for add-on cooperation with a door of a motor vehicle comprising an elongate tread member, a first tread supporting bracket adapted to be fixedly mounted to the door to depend to a lower end below the vehicle body adjacent the door, means for fixedly connecting one end of the tread member to the lower end of the first bracket, and a second tread supporting bracket cooperatively arranged relative to the first bracket and fixedly mountable to the vehicle frame adjacent the door to define a horizontal tread supporting bar portion at substantially the level of the one end of the tread member for sliding supporting cooperation with the underside of the tread member during opening and closing movement of the door.

6. Apparatus according to claim 5 including a clip assembly adapted for connection to the vehicle independently of the first and second brackets at substantially the level of the second bracket bar portion, the clip assembly having spring fingers between which the other end of the tread member is intimately engaged when the door is in its closed position.

* * * * *